April 14, 1931.  W. W. SCHERER  1,800,474
METER FOR ALTERNATING CURRENT
Filed Oct. 30, 1929
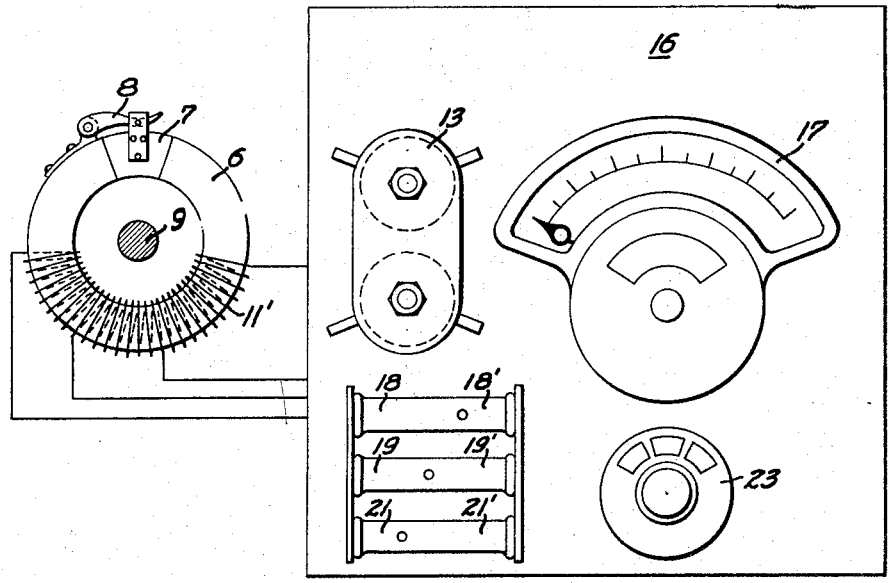
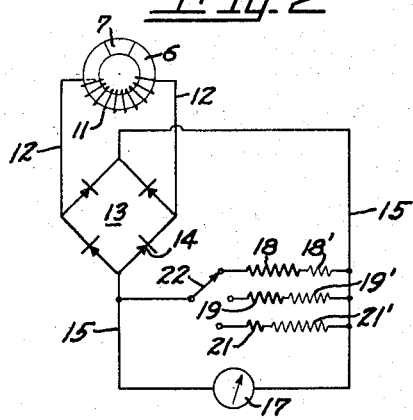
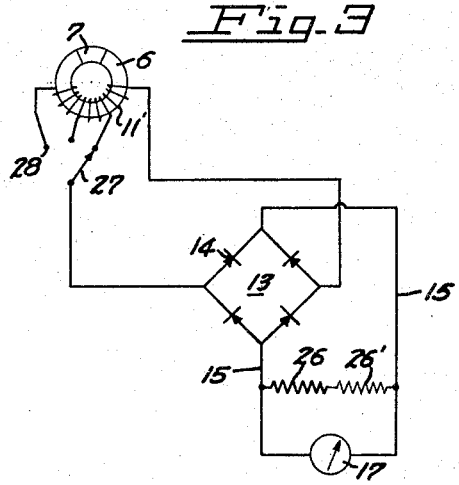
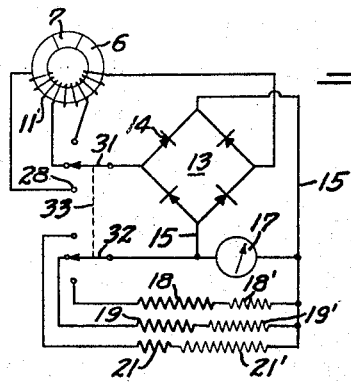
INVENTOR
WILLIAM W. SCHERER
BY Charles S. Evans
HIS ATTORNEY Patented Apr. 14, 1931

1,800,474

UNITED STATES PATENT OFFICE

WILLIAM W. SCHERER, OF OAKLAND, CALIFORNIA, ASSIGNOR TO WESTERN ELECTRO-MECHANICAL CO., INC., OF OAKLAND, CALIFORNIA, A CORPORATION OF CALIFORNIA

METER FOR ALTERNATING CURRENT

Application filed October 30, 1929. Serial No. 403,453.

My invention relates to ammeters for alternating current, and particularly to what are known as line test sets by means of which the alternating current flowing in a line may be determined without opening the circuit.

An object of my invention is to provide a more rugged sensitive line test set than has hitherto been feasible.

Another object of my invention is to provide a means of using the simple D'Arsonval meter movement for alternating current measurement.

Still another object of my invention is to provide a meter having a substantially zero temperature coefficient.

A further object of my invention is to provide an alternating current meter having a substantially uniform scale.

The invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Fig. 1 is a plan view, partly diagrammatic, showing the apparatus used in one form of my invention.

Figs 2, 3 and 4 are schematic circuit diagrams of various modifications of my invention.

Broadly considered, the apparatus of my invention comprises a direct current ammeter, preferably of the D'Arsonval type, which is connected to the line in which current is to be measured, through a rectifier, and which is provided with a shunt having a temperature coefficient which is so proportioned to that of the rectifier as to give indications on the meter substantially independent of temperature. In its preferred form, the apparatus comprises a current transformer, the secondary winding of which supplies current to the rectifier and meter, which bears a predetermined known relation to the current flowing in the line. Means are provided for varying the ratio of line current to meter current, in order to make the instrument capable of accurate readings over a widely varying current range, and these means preferably include a plurality of shunts differing both in resistance and in their temperature coefficient of resistivity, so that the independence of temperature is maintained over the entire range of the instrument.

In its present preferred form my apparatus comprises a split core current transformer such as those described in Patent No. 1,141,642 to O. A. Knopp, or Patent No. 1,489,665 to W. J. Foster, W. W. Scherer, and J. Schmid. This type of transformer consists of a toroidal core 6 having a removable sector or wedge 7. The wedge is hinged to a spring pressed finger 8, by means of which it may be withdrawn and the core slipped over the line wire 9, which carries the current to be measured, after which the wedge is returned to the position shown, completing the magnetic circuit of the core.

The line wire 9 forms the primary of the transformer. The secondary winding 11 is wrapped around approximately half of the core and comprises many turns of relatively fine wire.

The winding 11 is connected by the leads 12 to the input terminals of a rectifier 13. The latter is preferably of the contact type, rectification taking place between a copper surface and a copper oxide film. This rectifier need not be described in detail since contact rectifiers of various kinds are well known in the art, all of them possessing substantially similar properties. All of these rectifiers possess a negative temperature coefficient of resistivity, that is, their electrical resistance decreases with rising temperature. Their rectification ratio, i. e., the ratio of D. C. output to A. C. input, also decreases with rising temperature, however, and although the two effects tend to neutralize each other, the net result is a decrease of output current as the temperature rises. This effect may be termed a "negative temperature coefficient of performance."

This coefficient is not a constant, but is greater at small loads than at large ones.

It is preferable that the rectifier be of the so-called full-wave type. As the bridge circuit rectifier shown in the figures has the advantage of requiring only a single pair of conductors connecting with the transformer winding, it is the one that is usually desirable to use. The well known split winding type of rectifier circuit may, however, be substituted, and it is even possible to use the simple half wave rectifier in cases where lightness is of more importance than accuracy in the device.

The bridge type rectifier has four rectifying contacts 14. These contacts are so arranged that current can pass through the output circuit 15 of the rectifier in one direction only.

The rectifier is mounted on a base 16, closely adjacent to a direct current meter 17, preferably of the D'Arsonval type, which is connected in series with the output terminals of the rectifier. Since this meter is used to measure current, it may properly be termed an ammeter. It is preferable, however, that the meter be made with a winding having a relatively large number of turns of fine wire, that is, that it be more nearly the type of instrument that is usually used as a voltmeter than the ordinary direct current ammeter. An ordinary ammeter movement, or a millivoltimeter movement may be used, however, by properly modifying the design of the transformer.

As is well known, a meter of this type will indicate the average value of current passing through it and not the effective or root-mean-square current. As ordinary commercial current supplies approach very closely a sine wave form, the reading of the meter, multiplied by the ratio of the transformer, will indicate a current approximately 10% less than that which is actually flowing in its windings. This is compensated for by supplying the meter with a scale whose readings are 1.11 times the true direct current value. Experiment has shown that when so calibrated, the readings of the meter with any wave form which is apt to be met with in practice are not sensibly in error.

The meter is provided with one or more shunts, each having a different resistance, and each a different coefficient of resistivity. These shunts are wound non-inductively, comprising portions 18, 19, and 21 (Figure 2) of a substantially zero temperature coefficient material such as manganin, and portions 18', 19' and 21' of a positive temperature coefficient material such as copper or nickel.

The materials are combined in different proportions in the different shunts, the high resistance shunts having a higher proportion of high temperature coefficient material than the low resistance shunts. A switch 22 is provided for connecting any selected shunt across the input of the meter, which itself has a low temperature coefficient. The switch is provided with a suitable indicator, which may be combined with a control knob 23 as shown in Fig. 1.

In use the switch is set to connect that shunt across the meter which will give the largest indication of current within the meter range. As the temperature rises the current delivered to the meter circuit falls, owing to the coefficient of performance of the rectifier, but the concurrent increase in shunt resistance diverts an increasing portion of this current through the meter itself, with the result that its indications are substantially constant with temperature.

The temperature coefficient of the shunts is preferably so chosen as to correct exactly for the performance coefficient variation at about two thirds of the full scale readings of the meter on each scale. There will then usually be a slight temperature error in opposite directions above and below this point, but this may readily be kept within a few percent on the low-range scale, and may be reduced to a small fraction of this on the higher ranges.

The various types of rectifier vary somewhat in their performance characteristics and it is therefore not practical to give a formula for computing the shunts. The method which I prefer is to plot the performance curve, draw a straight line which will most nearly represent this curve, and choose a value of temperature coefficient which will give the straight line correction. Other methods will suggest themselves to those skilled in the art.

A modification of the invention is shown diagrammatically in Figure 3. Here a single shunt 26, 26' is used across the meter, and the change in current range is accomplished by means of a switch 27 which connects to various taps 28 on the current transformer secondary 11'. The switch is positioned on the meter base and controlled exactly as in the previous modification. This arrangement has the advantage of loading the rectifier uniformly for all ranges. Its disadvantages are a more expensive transformer, and the necessity of a multiconductor cable between the transformer and meter.

Another modification, and for many purposes the most valuable, uses a combination of the two methods. In this form, shown in Fig. 4, a switch 31 selects the suitable transformer tap while a second switch 32, mechanically interconnected therewith, simultaneously selects the proper shunt. The interconnection 33 may be an insulated shaft common to both switches, or a link connecting the switch arms.

This arrangement offers a means of using a single meter for a range of current measurements, say from 1000 amperes full scale to 12 amperes full scale, without using an excessive number of turns on the transformer and with substantially the same percentage accuracy throughout.

All of the forms permit a more sensitive test set to be constructed at lower cost than is possible with the usual transformer and A. C. meter. The meter scale, moreover, is substantially uniform, and sets can easily be constructed with a full scale deflection of 12 amperes, whereas 35 amperes has been the limit of stable operation with A. C. meters.

It will be noted that the design of line test sets presents problems not encountered in ordinary current transformer practice, owing to the transformer primary being limited to a single turn, and the magnetizing forces available being correspondingly low. The energy available for the meter operation is so small that the device becomes unstable in the lower ranges, and since the present invention operates on extremely low energy, it is especially applicable in this field.

I claim:

1. A line test set comprising a current transformer having a split core and a secondary winding thereon, a rectifier in circuit with said winding, a direct current indicating device in circuit with the rectifier, and a shunt across the indicating device.

2. A line test set comprising a current transformer having a split core and a secondary winding thereon, a plurality of tapped connections to the winding, a switch adapted to selectively engage the tapped connections, a rectifier in circuit with the switch and the winding, a direct current indicating device in circuit with the rectifier, a plurality of shunts adjacent the indicating device, and means for selectively connecting the shunts across the indicating device.

3. In combination with a rectifier whose ratio of input A. C. energy to D. C. output energy varies with the temperature thereof, a current transformer connected to the input of said rectifier, a meter connected to the output of said rectifier, and means including a shunt having a temperature coefficient proportioned to said A. C. to D. C. ratio for changing the ratio of input transformer current to D. C. meter current and for maintaining the meter indications substantially independent of temperature changes.

4. In combination with a rectifier whose ratio of input A. C. energy to D. C. output energy varies with the temperature thereof, a current transformer connected to the input of said rectifier, a meter connected to the output of said rectifier, a plurality of shunts for said meter having different resistances and temperature coefficients, and means for connecting a selected shunt across said meter for changing the ratio of input transformer current to D. C. meter current and for maintaining the meter indications substantially independent of temperature changes.

5. In combination, a split core current transformer, a rectifier connected to the output circuit of said transformer, a meter connected to the output of said rectifier a plurality of shunts for said meter, each of said shunts having a different resistance and a temperature coefficient of resistivity proportioned to the temperature coefficient of performance of the rectifier corresponding with the load imposed on the rectifier by said shunt, and means for connecting a selected shunt in circuit with said rectifier.

6. In an alternating current measuring device, the combination of a transformer, a rectifier connected to the output of said transformer, a meter connected to the output of said rectifier, a plurality of shunts for said meter, and interconnected means for changing the transformer ratio and the meter shunt.

7. In an alternating current measuring device, the combination of a transformer, a rectifier connected to the output of said transformer, a meter connected to the output of said rectifier, a plurality of shunts for said meter having different temperature coefficients of resistivity, and interconnected means for changing the transformer ratio and the meter shunt.

8. In combination with a tapped transformer and a rectifier the direct current output of which varies with the temperature thereof and the load thereon, a meter connected to the output of said rectifier, a plurality of shunts for said meter having different temperature coefficients, a switch connected to contact with any of a plurality of taps on said transformer and connected to said rectifier, a switch for connecting any of said shunts across said meter, and a mechanical interconnection between said switches for varying them simultaneously.

In testimony whereof, I have hereunto set my hand.

WILLIAM W. SCHERER.